United States Patent Office 3,466,324
Patented Sept. 9, 1969

3,466,324
METHOD OF MANUFACTURING METHACRYLIC ESTERS FROM ALLENE
Sango Kunichika and Yasumasa Sakakibara, Takatsuki-shi, Osaka-fu, Japan, assignors to Chiyoda Kako Kensetsu Kabushiki Kaisha, Akasaka, Minato-ku, Tokyo, Japan
No Drawing. Filed July 7, 1966, Ser. No. 563,380
Int. Cl. C07c 67/00, 69/54
U.S. Cl. 260—486                                 8 Claims

ABSTRACT OF THE DISCLOSURE

Methacrylic esters are prepared by reacting allene with carbon monoxide and a saturated monohydric alcohol in the presence of nickel carbonyl and water at a temperature in the range 100–250° C. and a pressure of 5–100 atmospheres.

---

This invention relates to a method of manufacturing methacrylic esters through the reaction of allene with carbon monoxide and alcohols, and more particularly to a novel method of synthesizing methacrylic esters by the use of a catalyst composed essentially of nickel carbonyl in the carbonylation of allene.

It has been known that the methods for the manufacture of methacrylic esters from allene include those which consist of reacting allene with carbon monoxide and alcohols at a high temperature and under high pressure, specifically in the presence of a catalyst composed of tin or germanium salt and a salt of noble metal in Group VIII of the Periodic Table (Japanese patent publication No. 15,612/1961 and U.S. Patent No. 2,876,254) or in the presence of diruthenium nonacarbonyl or iron pentacarbonyl (U.S. Patent No. 2,871,262).

The method of the present invention is characterized by carbonylation of allene with carbon monoxide in the presence of nickel carbonyl and a small amount of water.

If the same procedure as described in the U.S. Patent No. 2,871,262 is followed except for the use of nickel carbonyl instead of the specified catalyst of iron carbonyl or ruthenium carbonyl, little methacrylic ester will be obtained from allene. Also, it is generally believed that in the case of nickel carbonyl to use as the catalyst, the presence of a mineral acid is essential for the carbonylation reaction. However, it is a feature of the present invention that the reaction is remarkably promoted by the presence of water, that is, little methacrylic ester is obtained in the absence of water.

In the method of the present invention, the usage of concentrated hydrochloric acid instead of water is not advisable because it gives methacrylic ester at a yield of only less than 3 percent and causes a secondary reaction such as polymerization of allene.

Usually in carbonylation reaction to use nickel carbonyl as the catalyst, the lower the pressure of carbon monoxide, the greater the rate of reaction. However, an excessive low carbon monoxide pressure is disadvantageous because it merely accelerates the decomposition of nickel carbonyl. It is an advantage of the method of the invention that no such a high pressure of 300 to 1,000 atm. as proposed by the above-mentioned U.S. patent is required but a pressure in the range of 5–100 atm. is sufficient for this purpose and that a preferred carbon monoxide pressure is in the range of 10–30 atm.

The suitable amount of nickel carbonyl is 0.01–0.2 mol, preferably 0.05–0.1 mol.

The suitable amount of water is 5–50 ml. preferably 10–40 ml. per 100 ml. of alcohol used. When the amount of water is increased, the percentage of methacrylic acid is increased.

If a concentrated hydrochloric acid is employed in place of water, the yield of methacrylic acid ester will drop sharply and a large amount of gummy solid will be produced.

The reaction temperature in the method of the present invention depends on the amount of water, pressure of carbon monoxide, and, to lesser extents, on the other factors. While the presence of water promotes the reaction and lowers the reaction temperature, the pressure of carbon monoxide beyond a certain degree, e.g. 100 atm., will rather inhibit the reaction and necessitate a high temperature for the reaction.

In general, the desirable reaction temperature is about 100–250° C. with major benefits being obtained at 150–230° C.

Suitable alcohols for use in the present invention are saturated aliphatic monohydric alcohols containing one to 12 carbon atoms, for example methanol, ethanol, propanol, butanol, hexanol, 2-ethyl hexanol, and dodecanol.

The reaction of the invention may be carrier out either by a batch operation or a continuous operation.

In short, the advantageous features of the present invention lie in the fact that methacrylic acid ester is obtained under a low pressure and still at a relatively good yield by the use of nickel carbonyl and water in carbonylation of allene with carbon monoxide.

The foregoing detailed description is illustrative of the invention but is should not be construed that the scope of the present invention is limited thereto. Now, the invention is illustrated by the following examples.

EXAMPLE 1

15 ml. of methanol, 5 ml. of water, 0.05 g. of hydroquinone, and 2.0 g. of nickel carbonyl were charged into a stainless steel autoclave having a capacity of 100 ml. equipped with an electromagnetic stirrer. The autoclave was closed, and cooled with Dry Ice and methanol to about —50° C. It was exhausted by an aspirator and nitrogen was introduced thereinto. This procedure was carried out again. Finally the vessel was exhausted with the aspirator, and connected to a storage bottle containing liquid allene (capable of resisting high pressures up to 20 atm. and having a capacity of 100 ml.). By distillation 8.2 g. of allene were added to the mixture in the autoclave. And then the temperature of autoclave was raised up to a room temperature (also to a pressure of about 3 atm.), and carbon monoxide was charged into the vessel until the total pressure reached 56 atm. With stirring, the content in the autoclave was heated up to 210–215° C. over a period of 1.0 hour, and then kept at the temperature for 2.4 hours. Meanwhile, the pressure rose to a maximum of 148 atm. About 30 minutes after arrival at the reaction temperature, the pressure began to drop and the pressure drop continued for about 1.5 hours, down to 68 atm. On completion of the reaction, the autoclave was cooled and the gas was exhausted. To the reaction mixture obtained, 40 ml. of dilute sulfuric acid and 20 ml. of methylene chloride were added in order to separate the organic layer therefrom. Again, the resultant was extracted with 20 ml. of methylene chloride and was mixed with the organic layer. On analysis with gas chromatography (as well as fractional distillation), the resulting solution afforded 4.8 g. of methyl methacrylate (at a yield of 23.5% of the total amount of allene used as the starting material) and 1.1 g. of methacrylic acid (6.3%).

EXAMPLE 2

By the same procedure as described in Example 1, the autoclave was charged with 15 ml. of methanol, 2 ml. of water, 0.05 g. of hydroquinone, 2 g. of nickel carbonyl, 7.8 g. of allene, and carbon monoxide (up to 31 atm.). The mixture was treated at 171–175° C. for 9.5 hours.

The pressure reached a maximum of 82 atm. and dropped to 30 atm. after 3.5 hours. Then, carbon monoxide was replenished until the pressure attained to 68 atm., and the reaction was continued. The reaction product was treated in the same manner as in the preceding example. On analysis with gas chromatography, it yielded 3.6 g. of methyl methacrylate (18.5% of the total amount of allene) and 0.6 g. (3.6%) of methacrylic acid.

EXAMPLE 3

In the same way as in the preceding examples, 20 ml. of methanol, 6 ml. of water, 0.1 g. of hydroquinone, and 2 g. of nickel carbonyl were charged into the autoclave. While the vessel was being cooled, the inner air was thoroughly replaced by nitrogen, and carbon monoxide was charged therein up to 15 atm. Thus, the mixture was heated to a reaction temperature of about 180° C. and the total pressure was kept at about 40 atm., and 7.8 g. of allene were continuously charged into the vessel over a period of 2.2 hours thereby to effect the reaction. During the same period carbon monoxide was supplied continuously. After charging of allene, the mixture was maintained at the same reaction temperature for 0.5 hour. An analysis with gas chromatography proved that the product was 6.7 g. of methyl methacrylate (34.4% of the total amount of allene) and 3.4 g. of methacrylic acid (20.4%).

What is claimed is:

1. A method of manufacturing methacrylic esters which comprises reacting allene with carbon monoxide and a saturated aliphatic monohydric alcohol in the presence of nickel carbonyl and water under elevated temperature of from 100–250° C. and a pressure of 5–100 atmospheres.

2. A method of manufacturing methacrylic esters according to claim 1, wherein the mole ratio of nickel carbonyl to allene is 0.01–0.1.

3. A method of manufacturing methacrylic esters according to claim 1 in which the alcohol contains 1–12 carbon atoms.

4. A method of manufacturing methacrylic esters according to claim 3, wherein the mole ratio of water to the alcohol is 0.1–1.1.

5. The method according to claim 4, wherein the mole ratio of water to the alcohol is 0.2–0.9.

6. A method according to claim 1 wherein the temperature range is 150° to 230° C.

7. A method according to claim 1 wherein the pressure of carbon monoxide is from 10 to 30 atmospheres.

8. A method according to claim 3 wherein the alcohol is methanol.

References Cited

UNITED STATES PATENTS

| | | | |
|---|---|---|---|
| 2,448,368 | 8/1948 | Gresham et al. | 260—533 |
| 2,871,262 | 1/1959 | Benson | 260—486 |
| 2,876,254 | 3/1959 | Jenner et al. | 260—486 |

LORRAINE A. WEINBERGER, Primary Examiner

A. P. HALLUIN, Assistant Examiner